United States Patent [19]

Johnston

[11] Patent Number: 5,197,883

[45] Date of Patent: Mar. 30, 1993

[54] SOUND-CODED READING

[76] Inventor: Louise D. Johnston, 336 Turley Falls Rd., Hendersonville, N.C. 28739

[21] Appl. No.: 919,169

[22] Filed: Jul. 23, 1992

Related U.S. Application Data

[63] Continuation-in-part of Ser. No. 798,661, Nov. 26, 1991.

[51] Int. Cl.5 ................................................. G09B 1/00
[52] U.S. Cl. ..................................... 434/167; 434/185; 434/370
[58] Field of Search ............... 434/178, 158, 159, 167, 434/368, 370, 185, 157, 156

[56] References Cited

U.S. PATENT DOCUMENTS

| | | | |
|---|---|---|---|
| 3,407,515 | 10/1968 | Putman | 434/185 |
| 3,426,451 | 2/1969 | Hoffman | 35/35 |
| 4,007,548 | 2/1977 | Cytanovich | 35/35 R |
| 4,030,211 | 6/1977 | McGinley | 35/35 H |
| 4,193,212 | 3/1980 | Al-Kufaishi | 35/35 R |
| 4,247,995 | 2/1981 | Heinberg | 434/185 |
| 4,609,357 | 9/1986 | Clegg | 434/167 |
| 4,655,713 | 4/1987 | Weiss | 434/178 |
| 5,057,020 | 10/1991 | Cytanovich | 434/178 |
| 5,110,295 | 5/1992 | Concra | 434/368 X |
| 5,117,568 | 6/1992 | Bean | 434/368 X |

Primary Examiner—Gene Mancene
Assistant Examiner—L. Thomas
Attorney, Agent, or Firm—Joseph T. Guy, Jr.

[57] ABSTRACT

A sound-coded system for teaching beginning reading using four sound descriptors which allows one letter or digraph to represent each sound without altering the traditional orthography, or correct American English spelling, of the original words. The sound descriptors correspond to the long vowel sounds, the single-sound digraphs, the silent or misleading letters, and the sounds made with a slight throat utterance. The simplicity and reliability of sound-coding makes decoding of unfamiliar words a game for beginning readers.

5 Claims, 1 Drawing Sheet

SOUND-CODED READING

This is a continuation-in-part of copending application Ser. No. 07/798661 filed on Nov. 26, 1991.

BACKGROUND

Teaching a student to read the English language is one of the most challenging and rewarding aspects of the education process. Phonetic teaching has been a major tool for the educator for many years. Students have been taught to memorize the sounds of various combinations of letters in familiar words and then apply those sounds to the same combination in unfamiliar words. This method can quickly frustrate a student when identical combinations have completely different sounds as in the words comb, tomb and bomb, for example.

The use of symbols to represent sounds has been the basis for phonetics in dictionaries for decades. Unfortunately, a word that is spelled phonetically deprives the student of learning the correct spelling and retards his ability to sight read, which is the eventual goal. Improvements in phonetic methods are provided by Clegg, U.S. Pat. No. 4,609,357. The basic problem of phonetic coding is still present, specifically the spelling of the underlying word is lost. All of the phonetic reading methods require the student to learn an auxiliary alphabet in addition to the standard English alphabet. Pictures to represent the basic vowel sounds have been provided by Cytanovich in U.S. Pat. Nos. 4,007,548 and 5,057,020. These would be extremely cumbersome for a child to use when decoding an unfamiliar word or for a teacher to apply to written text as a teaching aid.

The clever use of fonts has been presented by Hoffman in U.S. Pat. No. 3,426,451 as a way to distinguish sounds. These suffer many of the same problems common to the art in that a burden would be placed on the student trying to decode a word and to a teacher attempting to apply the code to new words. Replacing the fonts with symbols as advanced by Weiss, U.S. Pat. No. 4,655,713 still does not circumvent the problems of difficulty in use.

A unified system of symbols has been detailed by Al-Kufaishi in U.S. Pat. No. 4,193,212. This symbol set circumvents some of the problems mentioned. The word being taught to the student is spelled correctly with diacritic marks placed on, or in proximity to the letters. The teachings of Al-Kufaishi require the student to learn twenty four new intricate diacritical marks, plus the traditional diacritics, in order to give the twenty six letters of the alphabet the correct pronunciation of his forty seven sounds as found in printed American English. Thus, the system provided by Al-Kufaishi is impractical for the beginning reader.

There has been a long felt need in the art to provide a tool for teaching unfamiliar words while maintaining the correct spelling of the word. Furthermore, there has been a need to provide a tool which does not require the student to learn a large number of symbols and which can be easily added to a written page.

SUMMARY OF INVENTION

A sound-coded system is provided which does not require the memorization of a large number of symbols and which does not obscure the correct spelling of the word. These and other advantages, as will be realized by one skilled in the art, are provided by a simple coding system useful in teaching beginning reading. The simple coding system comprises four sound descriptors making it possible for one letter or digraph to consistently represent each sound in American English. The first sound descriptor indicates the long vowel sound; the second sound descriptor indicates a two-letter combination which forms a single sound; the third sound descriptor indicates a silent or misleading letter; the fourth sound descriptor indicates the sound made with a slight throat utterance.

A useful set of marks to indicate the accurate sounds within printed English words is provided in a sound-coding system for teaching beginning reading comprising four distinct sound descriptors placed on or in close proximity to a letter or digraph which is to be altered; wherein the first sound descriptor is an overline and indicates the letter has the long vowel sound; the second sound descriptor is an underline and indicates the combination of two letters forming a single sound; the third sound descriptor is a diagonal line through a letter(s) which indicates that the letter(s) are silent or misleading; the fourth sound descriptor is a double underline and indicates the sound of the letter or digraph is made with a slight throat utterance.

Also provided herein is a preferred method of use which details a book comprising alternating opaque pages and transparent pages wherein the opaque pages comprise text; the transparent pages comprise sound descriptors which overlay the text of the opaque page; the sound descriptors comprise four marks wherein one mark indicates the long vowel sound; one mark indicates the combination of two letters which form a single sound; one mark indicates a silent or misleading letter; one mark indicates the sound made with a slight throat utterance.

DETAILED DESCRIPTION OF INVENTION

Figure 1:
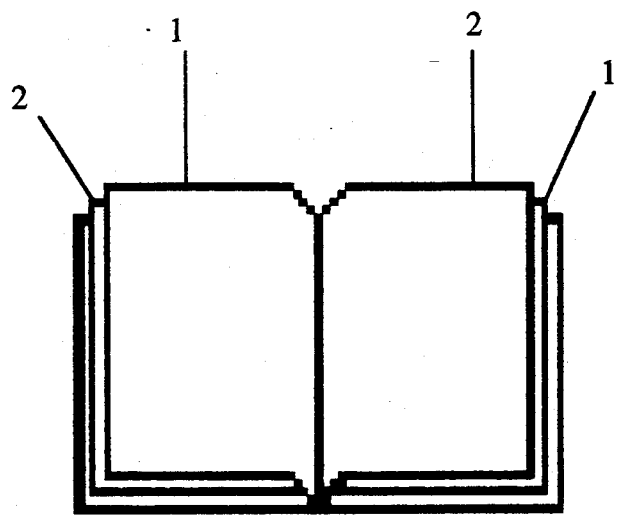
FIG. 1 illustrates a book with opaque and transparent pages interleaved.

The adequate coding of written words within the teachings of the current invention requires a set of sound descriptors comprising four marks which correspond to the sounds:

a) the long vowel sounds as found in such words as
 the "a" in great, ate,
 the "e" in mean, he,
 the "i" in right, pie,
 the "o" in note, no,
 the "u" in use, cute,
 the "y" in my, sky,
b) combinations of two letters, or digraphs, which form a single sound, or phoneme, such as
 the "au" in audio,
 the "aw" in awful,
 the "ar" in arm,
 the "ch" in child,
 the "er" in her,
 the "ir" in stir,
 the "ur" in fur,
 the "or" in corn,
 the "ou" in out,
 the "ow" in owl,
 the "oi" in oil,
 the "oy" in boy,
 the "oo" in book,
 the "sh" in shop, the "th" in thin,
the "wh" in when;
c) silent letters such as
the "e" in ate, cake;
or letters which are misleading such as the "o" in women, woman;
d) the sounds which are made with a slight throat utterance such as
the "f" in of,
the "s" in is,
the "th" in this,
the "y" in yes.

The selection of sound descriptors is not critical and not restricted by the teachings herein. While the physical sound descriptors, or marks, are not critical several criteria should be strictly adhered to when a sound descriptor set is chosen. The marks which are used as sound descriptors should be maintained throughout the teaching phase to avoid confusion. The marks should be easy to use and recognize, and the marks should be fine line so they do not obscure the letters. It is preferable to use marks which are on, or in close proximity, to the letters. Based on these criteria the preferred marks are all straight lines. More preferred are: a line over the long vowel, or overline, such as applied in:
ape, me, bite, hope, use;
a line under two letters, or underline, which form a single sound, or phoneme, as applied in:
chin, ship, her, ring;
a diagonal line through silent or misleading letters as applied in:
ate, coat, women, off;
a double underline for the slight throat utterance as applied in:
of, is, yes, this.

Application of sound-coding can be accomplished in several ways. A written work can be easily marked with the chosen set of sound descriptors. Care must be taken to correctly mark the words based on correct pronunciation. The markings can be easily incorporated in books for teaching children to read.

The same coding is easily applied directly onto any printed material, making it possible for an adult to hand-code a childs' book. No vocabulary control is needed when books are sound-coded because the child can independently decode unfamiliar words. Constantly seeing the correctly spelled underlying word allows him to quickly build a large sight vocabulary. If the child recognizes a word he ignores the sound coding but it is there if needed. The knowledge of sound and letter relationship will foster creative writing.

A particularly preferred method of use is in the context of a book wherein the opaque text pages, 1, are interleaved between transparent pages, 2, as shown in FIG. 1. The transparent pages contain the sound descriptor marks and beneath them the appropriate letters that replaced the misleading letters, as taught herein. When the transparent page overlays the opaque page the sound descriptor marks directly overlay the appropriate letters of the text. This allows the student to use the overlay transparency or lift it and read the text without the aid of the sound coding. The manufacture of books is well known in the art as exemplified in Encyclopedia Brittanica, Vol. 2, pages 370-1, 1991.

Table 1 comprises example words to illustrate the use of sound-coding. The example of the use of sound descriptors is intended to illustrate the teachings herein and is not limiting in any way. The list of sounds is presented substantially alphabetically with the appropriate coding. Sample words are included which have the sound descriptors fully utilized.

TABLE 1
SOUNDS AND APPLICATION OF THE INVENTIVE SOUND CODING SYSTEM

| Sound | Sample Word | Sound | Sample Word |
|---|---|---|---|
| ā | ape | ō | nō |
| a | at | o | not |
| au, aw | audio, awful | or | corn |
| ar | arm | ou, ow | out, owl |
| b | bat | oi, oy | oil, boy |
| ch | chin | oo | zoo |
| d | dad | oo | book |
| ē, y | me, funny | p | pop |
| e | met | r | red |
| er, ir, ur | her, fir, fur | s | six |
| f | if | s, z | is, zip |
| f, v | of, van | sh | shop |
| g | go | t | tent |
| h | hat | th | thin |
| ī, ȳ | pie, my | th | this |
| i | pit | u | use |
| j | jazz | u | us, about |
| k, c, ck | kitten, cat, sack | w | wish |
| l | last | wh | whip |
| m | mom | y | yes |
| n | nest | zh | vision |
| ng | ring | | |

Table 2 comprises sound-coded words which are typically considered difficult to teach a beginning reader.

TABLE 2
TYPICAL WORDS CONSIDERED DIFFICULT FOR THE BEGINNING READER AND SOUND-CODING FOR EACH

| | | | |
|---|---|---|---|
| mothers | putt | women | this |
| was | put | woman | his |
| saw | blood | bear | vision |
| they | feathers | been | motion |
| enough | elephant | city | could |
| though | laughed | giant | dog |
| through | signed | worm | so |
| thought | painted | war | now |
| you | pitcher | blue | do |
| pizza | picture | blew | eight |
| orange | onions | rule | one |

I claim:
1. A sound-coded system useful in teaching beginning reading consisting of sound descriptors; wherein
a first sound descriptor indicates the long vowel sound;
a second sound descriptor indicates a two-letter digraph forming a single sound;
a third sound descriptor indicates a silent letter;

a fourth sound descriptor indicates the sound made with a slight throat utterance; a fifth sound descriptor indicates a misleading letter.

2. The sound-coded system recited in claim 1 wherein the sound descriptor for the long vowel sound is an overline; the sound descriptor for the two-letter digraph forming a single sound is an underline under said two-letter digraph; the sound descriptor for the silent letter is a diagonal line through said silent letter; the sound descriptor for the letter representing a sound made with a slight throat utterance is a double underline under said letter representing a sound made with a slight throat utterance; the sound descriptor for the misleading letter is a diagonal line through said misleading letter.

3. A book comprising alternating opaque pages and transparent pages wherein said opaque page comprises text; wherein said transparent pages comprise sound descriptors which overlay said text of said opaque page; said sound descriptors comprise five marks wherein one said mark indicates the long vowel sound; one said mark indicates the two-letter digraph forming a single sound; one said mark indicates a silent letter; one said mark indicates the sound made with a slight throat utterance; one said mark indicates a misleading letter.

4. A book as recited in claim 3 wherein an overline indicates the long vowel sound; an underline indicates the two-letter digraph forming a single sound; a diagonal line indicates a silent letter; a double underline indicates a sound made with a slight throat utterance; a diagonal line indicates a misleading letter.

5. A sound-coded system for teaching beginning reading consisting of sound descriptors each placed on or in close proximity to a letter if its sound does not agree with the sound in the spoken word; wherein
- a first sound descriptor is an overline and indicates the letter has the long vowel sound;
- a second sound descriptor is an underline and indicates a two-letter digraph forming a single sound;
- a third sound descriptor is a diagonal line through a letter, which indicates that the letter is silent;
- a fourth sound descriptor is a double underline and indicates the sound is made with a slight throat utterance; a fifth sound descriptor is a diagonal line through a letter which indicates that the letter is misleading. e

* * * * *